United States Patent
Rockenfeller et al.

[11] Patent Number: 5,360,057
[45] Date of Patent: Nov. 1, 1994

[54] DUAL-TEMPERATURE HEAT PUMP APPARATUS AND SYSTEM

[75] Inventors: Uwe Rockenfeller; Lance D. Kirol, both of Boulder City, Nev.

[73] Assignee: Rocky Research, Boulder City, Nev.

[21] Appl. No.: 756,445

[22] Filed: Sep. 9, 1991

[51] Int. Cl.$^5$ ............................................. F25B 17/08
[52] U.S. Cl. ................................. 165/104.12; 62/478; 62/480
[58] Field of Search ................. 165/104.12; 62/480, 62/478

[56] References Cited

U.S. PATENT DOCUMENTS

| | | |
|---|---|---|
| 2,068,891 | 1/1937 | Scholl . |
| 2,088,276 | 7/1937 | Nesselmann et al. . |
| 4,111,002 | 9/1978 | Van Mal et al. . |
| 4,183,227 | 1/1980 | Bouvin et al. . |
| 4,199,959 | 4/1980 | Wurm ............................... 62/430 |
| 4,408,468 | 10/1983 | Alefeld . |
| 4,439,994 | 4/1984 | Briley . |
| 4,548,046 | 10/1985 | Brandon et al. ................... 62/480 |
| 4,594,856 | 6/1986 | Rothmeyer . |
| 4,610,148 | 9/1986 | Shelton . |
| 4,623,018 | 11/1986 | Takeshite et al. . |
| 4,637,218 | 1/1987 | Tchernev . |
| 4,656,839 | 4/1987 | Cross et al. ....................... 62/478 |
| 4,694,659 | 9/1987 | Shelton . |
| 4,701,199 | 10/1987 | Kabe et al. . |
| 4,709,558 | 12/1987 | Matsuchita . |
| 4,765,395 | 8/1988 | Paeye et al. . |
| 4,823,864 | 4/1989 | Rockenfeller ................. 165/104.12 |
| 4,848,994 | 7/1989 | Rockenfeller . |
| 4,881,376 | 11/1989 | Yonezawa et al. .................... 62/480 |
| 4,976,117 | 12/1990 | Crozat et al. .................. 165/104.12 |
| 5,005,371 | 4/1991 | Yonezawa . |
| 5,024,064 | 6/1991 | Yonezawa ............................. 62/480 |
| 5,027,607 | 7/1991 | Rockenfeller . |
| 5,085,271 | 2/1992 | Yanadori et al. ............. 165/104.12 |

FOREIGN PATENT DOCUMENTS 1399607 4/1965 France .
3044041 7/1982 Germany .

Primary Examiner—Albert W. Davis, Jr.
Attorney, Agent, or Firm—Jerry R. Seiler

[57] ABSTRACT

Apparatus for simultaneously supplying heating and cooling or refrigeration comprises first and second reactors each containing a complex compound of a metal salt and a gaseous refrigerant adsorbed thereon, a condenser, refrigerant conduit means for directing the refrigerant to and from the condenser and reactors, and fluid conduit means for directing heat transfer fluid in heat exchange communication with the condenser and selectively with the reactors. In another embodiment each reactor contains a different salt and instead of a condenser, energy is recovered through heat exchange fluid in heat exchange communication with the reactors.

25 Claims, 3 Drawing Sheets

DUAL-TEMPERATURE HEAT PUMP APPARATUS AND SYSTEM

BACKGROUND OF THE INVENTION

Systems for taking advantage of complex compound technology comprising solid-vapor compositions formed by adsorption of gas molecules on a solid adsorbent are known. Heat pump systems incorporating reactors provided with complex compounds provide significant advantages over conventional heat pump systems used for residential and commercial space conditioning, industrial heat pumping and refrigeration in view of high temperature lift created by the solid-vapor media as compared to other sorption media. The complex compound based systems can eliminate the need for cooling towers, lift staging, and require few, if any, moving parts. Such systems also obviate the use of objectionable CFCs.

The solid-vapor compounds suitable for heat pumps include complex compounds comprising materials which adsorb molecules of a polar refrigerant gas to form coordinative bonds in which the gaseous reactant coordinates via electron displacement with a solid adsorbent, commonly a solid metal inorganic salt. The adsorption/desorption process releases significant heat during adsorption, and adsorbs energy during the desorption phase. A number of useful complex compounds and systems are disclosed in U.S. Pat. Nos. 4,822,391 and 4,848,944. Such compounds and their uses and systems described in the aforesaid patents are incorporated herein by reference.

There is a need for complex compound heat pump systems having the capability of simultaneously producing heat, primarily in the form of hot water or steam, and refrigeration. For example, in the food processing industry, hot water, a heat transfer fluid or steam is used in washing and cleaning operations, while other operations performed at the same time, in the same plant, require cooling and/or refrigeration. It is to an apparatus and system that is capable of simultaneously producing such hot fluid and cooling and/or refrigeration, that the present invention is directed.

SUMMARY OF THE INVENTION

An apparatus and system of the present invention using complex compound heat pump technology provides a system for simultaneously producing hot water and refrigeration. The invention incorporates an apparatus having a pair of reactors using a single stage cycle incorporating a gaseous refrigerant, preferably ammonia or water, in a phase change embodiment. The alternate adsorption and desorption of the ammonia with the complex compound is cycled such that one reactor is in an adsorption phase while the other reactor is in the desorption phase. In addition to a condenser for the ammonia refrigerant, preferred apparatus embodiments include other heat exchange means for taking advantage of heat transfer between the desorbed refrigerant gas and the heat transfer fluid, for example, the industrial plant water, which is to be heated by the apparatus. The system of the invention may also be advantageously used for dual temperature thermal storage, as will be further described hereinafter.

DETAILED DESCRIPTION

Figure 1:
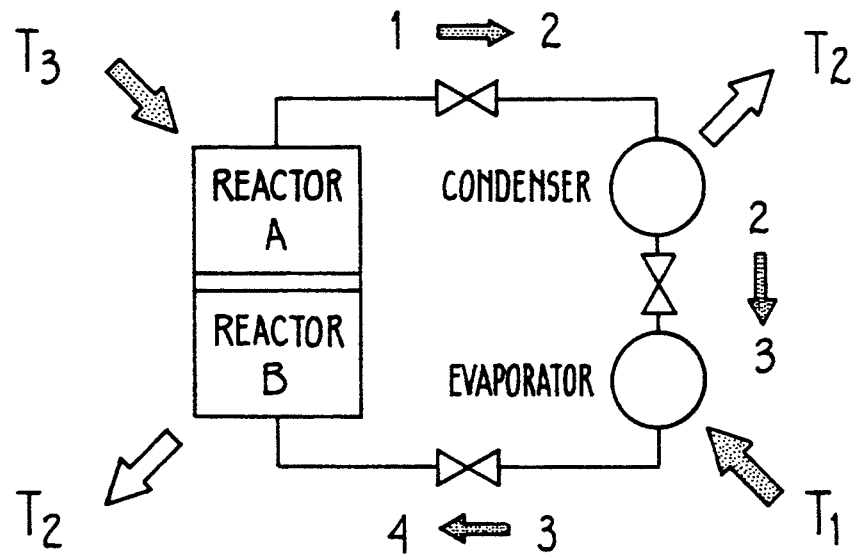
FIGS. 1 and 2 illustrate a single-stage complex compound heat pump cycle of the type used in the apparatus of the invention.
Figure 2:
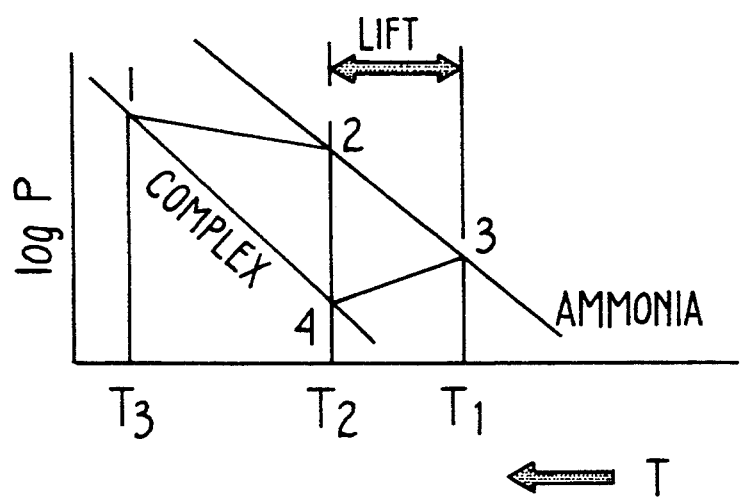

In FIG. 1, a schematic representation of two reactors, A and B, combined with a condenser and evaporator for treating the refrigerant vapor is shown. A temperature-pressure diagram for ammonia and a single complex compound used in both reactors A and B is also shown. In a chemisorbtion reaction in which the refrigerant gas, ammonia, is alternately adsorbed and desorbed from the complex compound located in the reactors, the reaction cycle is as follows:

In phase 1-2 between state points 1 and 2, complex compound in reactor A is heated to temperature $T_3$ with either prime energy or high temperature waste heat, resulting in refrigerant vapor pressure higher than the pressure of the refrigerant at the delivery temperature $T_2$. Complex A undergoes an endothermic desorption reaction releasing ammonia which is condensed at delivery temperature $T_2$, releasing energy.

In phase 2-3, ammonia is condensed at point 2 and typically throttled to a lower pressure and evaporated at temperature $T_1$ (point 3). Energy absorbed at $T_1$ represents waste heat recovery or useful refrigeration, depending on the application.

At phase 3-4, the complex compound in reactor A is at, or slightly above, heat delivery temperature, whereby the vapor pressure of the complex compound is less than the vapor pressure of the refrigerant at refrigeration or heat recovery temperature, causing the refrigerant to evaporate at $T_1$, which is then adsorbed into the salt in reactor B at $T_2$. The adsorption reaction is exothermic, releasing heat to the industrial process.

In phase 4-1, the complex compound is heated by the prime heat source to temperature $T_3$. A portion of this heat may be supplied from a phase shifted second subsystem or from the same sub-system reactor A to be cooled toward temperature $T_2$.

The apparatus of the invention incorporates two complex compound reactors and operates in two main sequential time periods, all of the cycles occurring in each of the sequences or time periods. One reactor desorbs refrigerant in an endothermic reaction while the other reactor adsorbs refrigerant in an exothermic reaction. In a basic apparatus for simultaneously providing heated heat transfer fluid and cold refrigerant, for example water and ammonia, respectively, refrigerant desorbed from a first reactor is directed to a condenser where it is cooled, and then recovered for cooling or refrigeration. Typically, the condensed refrigerant is directed to the evaporator of an existing refrigeration system to provide cooling, and the gaseous refrigerant returned to an adsorbing reactor. Simultaneously, water to be heated is directed to the condenser and the exothermic reaction in the adsorbing reactor. The sequential exposure for heating water in the condenser and adsorbing reactor will depend on the relative operating temperatures of those components with exposure first to the lower temperature component. At the end of a cycle, the functions of each reactor are reversed, i.e., interchanged.

Figure 3:
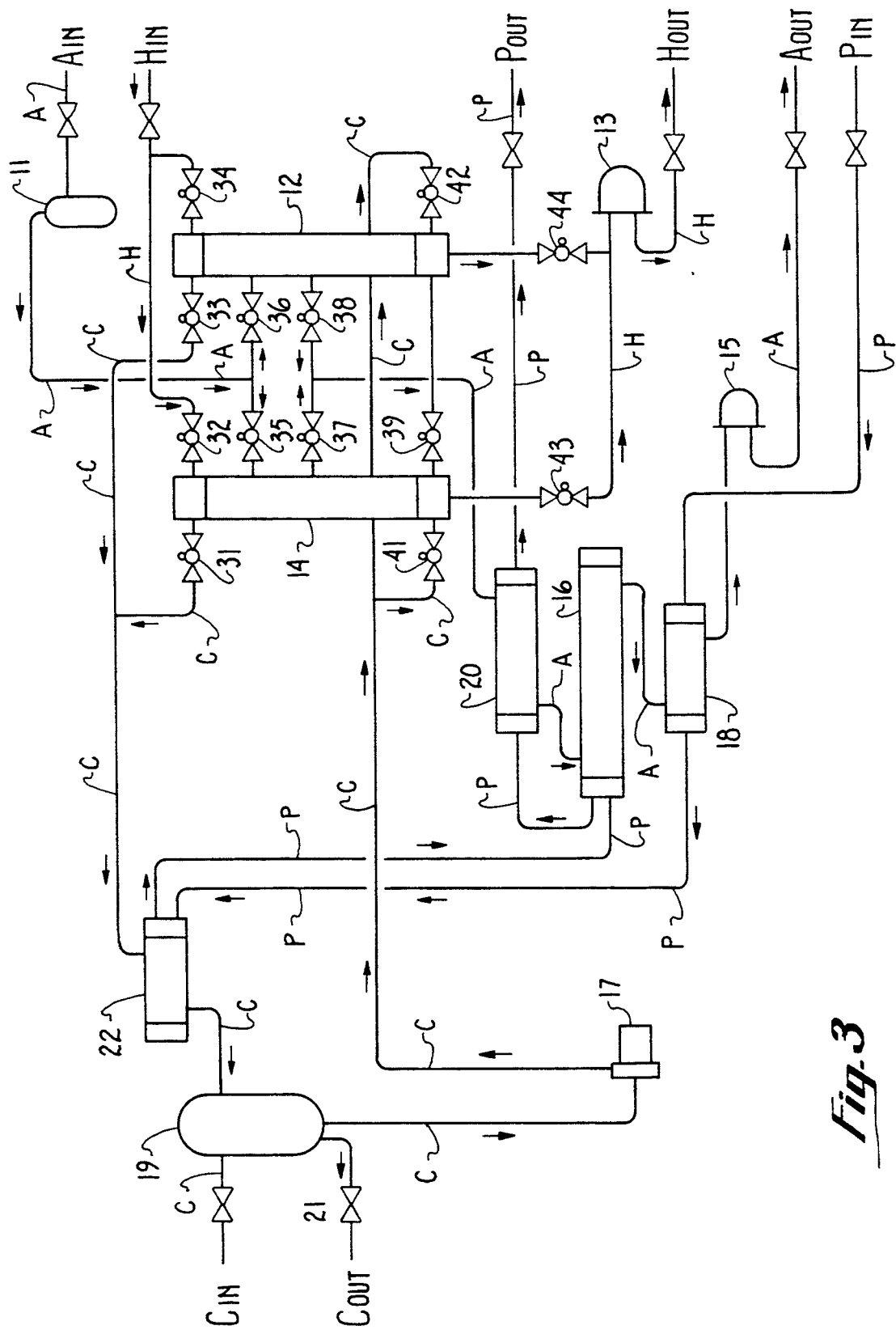
FIG. 3 illustrates schematically a preferred heat pump apparatus of the invention.

Referring to FIG. 3, a pair of reactors 12 and 14 are provided with a reactant, preferably a complex compound. For the discussion hereinafter, it will be assumed that the gaseous refrigerant which is alternately adsorbed and desorbed on the salt or complex compound, is ammonia. Other useful gaseous refrigerants and the scope of the metal salts used to form the reactants or complex compounds will be described further hereinafter. Although the heat transfer fluid directed to and from the reactors, and recovered as a heated fluid may sometimes be referred to hereinafter as water, it is to be understood that any suitable heat transfer fluid may be used, for example, steam, water glycol mixtures, oils, alcohols, as well as refrigerants, such as ammonia. In addition to the two reactors 12 and 14, the necessary components include a condenser 16 for treating the desorbed gaseous refrigerant by cooling it with, for example, relatively cool industrial plant water, which itself becomes heated in the heat exchange. The condensed ammonia is then useful to provide cooling or refrigeration, while the heated water is useful for plant processing operations.

In the preferred apparatus embodiment illustrated, an ammonia liquid subcooler 18 and/or an ammonia vapor heat exchanger, referred to as a desuperheater 20, are provided. In addition, a preferred apparatus includes a water/water heat exchanger 22, an expansion tank 19 for adding make-up water for cooling the reactors during adsorption, an ammonia suction trap 11, a steam trap 13, and a float valve 15 (ammonia vapor trap). The water/water heat exchanger 22 shown in the specific apparatus embodiment is used for recovering heat from the exothermic adsorption reactions. Such a heat exchanger is optional, and instead the water, or other heat exchange fluid to be heated in the process, may be directed through the adsorbing reactor to pick up heat directly from the reaction. However, where recovery of potable water is of importance, the use of such a heat exchanger may be advantageous.

The operation of the preferred embodiment heat pump of FIG. 3 is as follows. In a first phase, the complex compound in reactor 12 is desorbed by providing hot water or steam or other heat transfer fluid, from the plant into line H at $H_{in}$, with valves 34 and 44 open. The heat exchange design of reactor 12 allows the heat from the hot water and/or steam to heat the complex compound in the reactor, increasing the ligand vapor pressure and causing the complex compound to undergo an endothermic desorption reaction, releasing ammonia vapor. At the same time, relatively cool or ambient temperature plant water, for example at 80° F., is directed into pipe P at $P_{in}$. The desorbed ammonia released from reactor 12 is sequentially directed through open valve 38 via conduit A from the reactor sequentially through desuperheater 20, condenser 16 and liquid subcooler 18. Each of these components acts as a heat exchanger, and is provided with heat exchange means thermally communicating the desorbed ammonia with plant water which successively passes through subcooler 18, heat exchanger 22, condenser 16 and desuperheater 20. In this manner, the hot ammonia vapor desorbed from reactor 12 is cooled as it successively exchanges thermal energy with the plant water, which in turn is heated in the aforesaid components.

The relatively cool plant water is first thermally contacted with the condensed ammonia in liquid subcooler 18, thereby further cooling the ammonia and causing the plant water to become initially heated. The plant water is then directed to water/water heat exchanger 22 where it becomes additionally heated by thermal communication with heated water from the adsorbing reactors. Thereafter, the plant water is directed from the heat exchanger 22 to condenser 16, picking up additional heat from ammonia condensation and then to the desuperheater 20 for communicating thermally with the relatively hot ammonia vapor arriving from desorption reactor 12. The resulting heated water, for example at 130° F., is then directed along pipe P to $P_{out}$, where it is then directed for use in the plant as desired or needed. As previously noted, the sequence of components for water heating will depend on their relative operating temperatures, with water directed through successively higher temperature components. In the example shown, with the condenser operated at a higher temperature than the adsorbing reactors, water heat exchange takes place with the adsorbing reactor heat at heat exchanger 22 prior to heating in the condenser. However, in other systems, the adsorbing reaction temperature may be higher than the condenser temperature in which event, the sequence would be modified. An additional heat exchanger referred to as a trim heater, (not shown) may optionally be provided to further heat water downstream from desuperheater 20. Heat introduced to such a device may be from a steam or hot ammonia vapor line. The ammonia condensate from liquid subcooler 18 is directed via pipe H through high side float valve 15 through A out to the plant high pressure receiver where it is used for plant cooling or refrigeration operations. For example, the condensed or cold refrigerant is directed to an evaporator which may be part of an existing refrigeration system, or to other evaporator or heat exchanger receiving means.

Concurrently with the ammonia desorption in reactor 12, ammonia is adsorbed in reactor 14 with ammonia supplied via conduit A at $A_{in}$ via a suction trap 11, through open valve 35 and into reactor 14. In this phase, valves 36 and 37 are closed, as is valve 39. Hot water inlet valve 32 and outlet valve 43 are also closed, while heat transfer water from pipe C at $C_{in}$, via expansion tank 19, is pumped by water pump 17 into reactor 14 via open valve 41. Water inlet 42 for reactor 12 is also closed. Water directed through the reactors in heat exchange communication with the complex compound in reactor 14 is thus circulated via pipe C and directed from reactor 14 via outlet valve 31 to heat exchanger 22. Because the adsorption reaction occurring in reactor 14 is exothermic, the heat transfer water extracts heat from the reactor by heat exchange exposure, and thus will be warmed relative to the temperature of the plant water directed to heat exchanger 22. The plant water will be heated and the cooling heat transfer water somewhat cooled by this advantageous heat exchange communication.

Once the complex compound in reactor 12 has been substantially desorbed, i.e., is substantially depleted of ammonia, and the complex compound in reactor 14 is substantially saturated with ammonia, the reactors are reversed, whereby reactor 14 becomes the desorbing reactor and reactor 12 the adsorbing reactor. Prior to beginning the reverse cycle, a transition period or interval is provided by opening valve 39 which allows steam in reactor 12 to expand and drive remaining heat transfer water from reactor 14. Such an interval between cycles is highly desirable to avoid cavitation in the reactors. In addition, because the desorbing reactor is relatively hot as compared to the adsorbing reactor, it may be advantageous to direct the relatively hot heat transfer fluid from the desorbed reactor to the adsorbed reactor, which now becomes the desorbing reactor and requires heat to drive the reaction. Thereafter, the valve 39 is closed, and the previously described open valves are closed and the closed valves opened, whereby hot water and/or steam via conduit H is directed into and through reactor 14. The heated complex compound in reactor 14 desorbs ammonia, which is then sequentially directed via open valve 37 through heat exchanger 20, condenser 16 and liquid subcooler 18, and condensed ammonia recovered at $A_{out}$. Simultaneously, plant water via pipe P is continuously heated as previously described in the first cycle, and recovered via $P_{out}$.

Although a number of components of the apparatus shown in FIG. 3 are preferred, the liquid subcooler and desuperheater are optional, as are the ammonia suction trap, steam trap, expansion tank and water/water heat exchanger. However, such components contribute to improving the efficiency of the system and providing substantially greater temperature spreads between water introduced and recovered. The valves illustrated may also be substituted with four-way valves cooperating with control and switching means for directing heating water and cooling water as well as ammonia to and from the reactors. Moreover, the ammonia flow control valves 35, 36, 37 and 38 may be one-way check valves. Means may also be provided for circulating heat transfer fluid between the reactors during the previously described transition period, between cycles, to recover sensible heat thereby further improving the overall process efficiency.

The substantially continuous generation and recovery of hot water and condensed ammonia may be directed to receiving means respectively and used as needed and desired. The ammonia may be directed to a refrigeration system, into a high pressure receiver and used to provide refrigeration for any desired cooling or refrigeration processing needed.

Specific metal salts used to form complex compounds useful in the apparatus and systems of the invention include metal oxides, halides, carbonates, nitrites, nitrates, oxalates, sulfides and sulfates and chemical compounds, for example, double salts, and combination of salts and compounds as well as eutectic and peritectic mixtures thereof. Suitable double salt compounds are disclosed in U.S. Pat. No. 4,848,994 and are incorporated herein by reference. Preferred metals are selected from alkali and alkaline earth metals, transition metals, aluminum, zinc, cadmium and tin.

Polar gaseous refrigerants or reactants which are adsorbed on the solids to form the complex compounds, and which are especially useful in the invention, are ammonia, water, methylamine and methanol. Ammonia is especially preferred because it is stable and forms high energy complexes. However, sulfur dioxide, other lower alkanols, pyridine, alkylamines and phosphine may also be used. Carbon dioxide may also be reacted with metal oxides to form metal carbonates.

Particularly preferred systems incorporate the following complex compounds: (a) $CaCl_2 \cdot 4-8(NH_3)$ (b) $CaCl_2 \cdot 2-4(NH_3)$, (c) $SrCl_2 \cdot 1-8(NH_3)$, (d) $SrBr_2 \cdot 0-8(NH_3)$, (e) $CaBr_2 \cdot 2-6(NH_3)$, (f) $CoCl_2 \cdot 2-6(NH_3)$, (g) $NiCl_2 \cdot 2-6(NH_3)$, (h) $FeCl_2 \cdot 2-6(NH_3)$, and (i) $NaBF_4 \cdot 0.5-2.5(NH_3)$.

Although in the aforesaid complex compounds, numerical values of moles of ammonia per mole of salt are given, in some complexes, the mole range comprises several coordination steps. Thus, for example, in the case of $NaBF_4$, a number of different neighboring reaction steps occur between the numerical limits given. Typically, however, practical considerations only allow for use of a portion of the design coordination range, and thus the ranges are intended to be approximate, as will be understood by those skilled in the art.

Another embodiment of the apparatus and system of the invention for providing simultaneous dual-temperature results comprises a pair of reactors each having a different complex compound with the polar refrigerant, such as water or ammonia cycled between the two reactors in alternate adsorption and desorption, to create simultaneous heating and cooling. In such an embodiment, rather than directing the refrigerant to phase change components, i.e., a condenser as described in the previous embodiment, the heating and cooling is achieved by heat exchange in the reactors themselves during the adsorption and desorption reactions.

Figure 4:
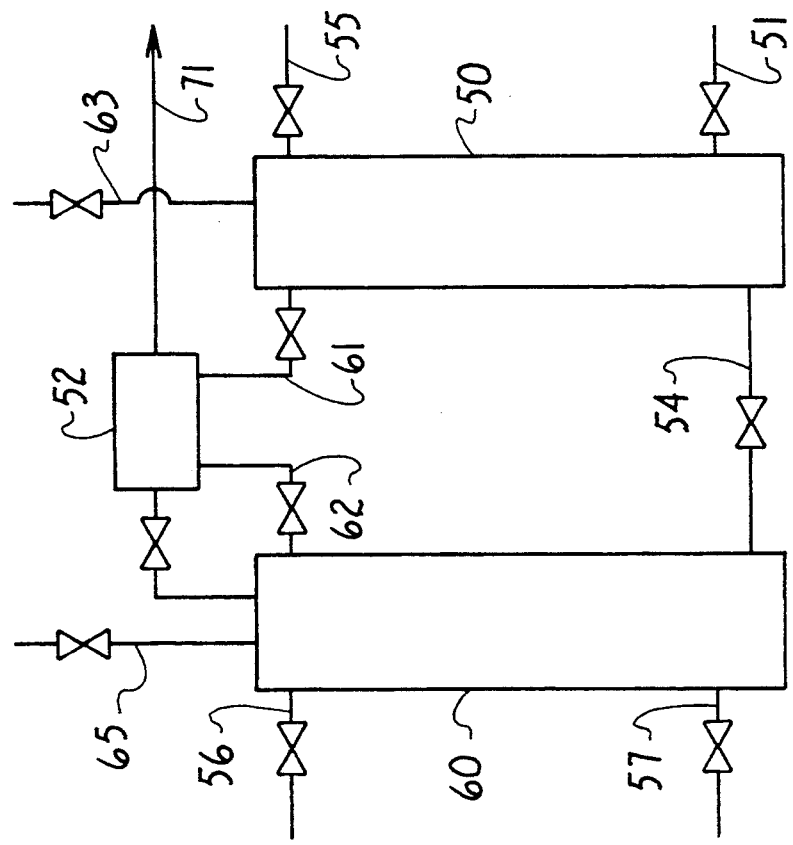
FIG. 4 is a schematic illustration of another embodiment of the invention.

In FIG. 4, there is schematically illustrated an apparatus comprising reactors 50 and 60, each having a different ammonia-salt complex, or other suitable polar refrigerant-salt complex as well as metal oxide and carbon dioxide reactions to form metal carbonate reactants. In this embodiment, it is also important that the different complex compounds or reactants in the respective reactors have substantially different equilibrium temperatures, preferably a differential of between about 20° C. and about 150° C. The term "equilibrium temperature differential" is intended to mean the difference between any two different complex compound equilibrium temperatures at the same or substantially the same operating pressure, typically between about 0.1 and about 50 bars. Such an equilibrium temperature differential provides sufficient practical temperature lift and yet within the practical and safe ranges for heat rejection during exothermic ammonia adsorption.

In one reactor, a preferred complex compound as previously described is present, herein referred to as group A, while in the other reactor, a different preferred complex compound, referred to as Group B, is $BaCl_2 \cdot 0-8(NH_3)$, $CaCl_2 \cdot 4-8(NH_3)$, $CaCl_2 \cdot 2-4(NH_3)$, $SrCl_2 \cdot 1-8(NH_3)$ and $NaBF_4 \cdot 0.5-2.5(NH_3)$. Preferred pairing of a Group B reactant with an above-described group A reactant is as follows:

| Group B | Group A |
| --- | --- |
| $BaCl_2 \cdot 0-8 (NH_3)$ | (a)–(i) |
| $CaCl_2 \cdot 4-8 (NH_3)$ | (d)–(i) |
| $CaCl_2 \cdot 2-4 (NH_3)$ | (d)–(i) |
| $SrCl_2 \cdot 1-8 (NH_3)$ | (e)–(i) |
| $NaBF_4 \cdot 0.5-2.5 (NH_3)$ | (a)–(h) |

Each of the reactors is provided with heat exchange means through which a useful and practical heat exchange fluid, i.e., water, glycol water, etc., is directed during the reaction. In the apparatus embodiment shown, reactor 50 is the high temperature reactor to be heated to desorb refrigerant at high temperature and adsorb at a mid-range temperature, while reactor 60, the cooler temperature reactor, adsorbs at a mid-range temperature and desorbs at low temperature to provide cooling or refrigeration. To obtain simultaneous or continuous heating and cooling, pairs of these two salt reactors will be used and operated in opposing or reverse cycles respectively. With reactor 50 adsorbing, water, typically at a temperature of between about 35° F. and about 250° F., introduced into the reactor via inlet conduit 51, becomes heated by heat exchanger exposure to the exothermic adsorption reaction process and is recovered via outlet pipe 55. At the same time, because of the equilibrium pressure difference between the compounds in the respective reactors, the complex compound in reactor 60 desorbs ammonia which is suctioned to adsorbing reactor 50 via pipe 54. The heat transfer fluid supplied to desorbing reactor 60 via pipe 56 gives up heat and becomes cooled by heat exchange exposure to the endothermic desorbing reaction and may be recovered via pipe 57. Such fluid may be used directly in plant processing, or it may be used for indirect heat transfer with a plant refrigeration system, for example, in a heat exchanger for providing cooling in the plant. Again, such a fluid may be water, water glycol mixtures, alcohols, or ammonia or other suitable fluid or refrigerant.

At the end of the cycle with the complex compound in reactor 50 being substantially saturated with ammonia, or other polar refrigerant, and the complex compound in reactor 60 being substantially depleted of the refrigerant, the cycles are reversed, with reactor 50 becoming the desorption reactor and reactor 60 becoming the adsorption reactor. Prime energy is supplied to reactor 50, for example with steam via pipe 51, to bring the complex compound to a high temperature for desorbing ammonia which is directed to adsorbing reactor 60 via line 54. Energy recovery from this cycle is primarily from adsorption reaction heat transfer to heat transfer fluid in reactor 60. If desired, some additional heating of the heat transfer fluid may be carried out in a desuperheater 52 by heat exchange with high temperature ammonia from desorbing reactor 50 via conduit 61, which is then directed to reactor 60 via conduit 62, instead of line 54. The heated fluid may be recovered via outlet line 71 for use.

Refrigerant supply conduits 63 and 65 to the reactors may also be provided. The reactors may also be provided with supplemental heating means, for example, electrical resistance heaters, exhaust gas, steam, or heat from any other suitable or available source for heating the complex compound during desorption. It may be preferred to combine pairs of the two different salt reactors with reactor pairs operated in alternating phases to provide more efficient continuous heating and cooling. Such reactor systems may also advantageously incorporate additional heat exchange means for taking advantage of the different ammonia (or other refrigerant) and heat transfer fluid temperatures recovered from the reactors, as well as to provide heating to the reactors for desorption, where appropriate or advantageous for improved performance and efficiency.

Figure 5:
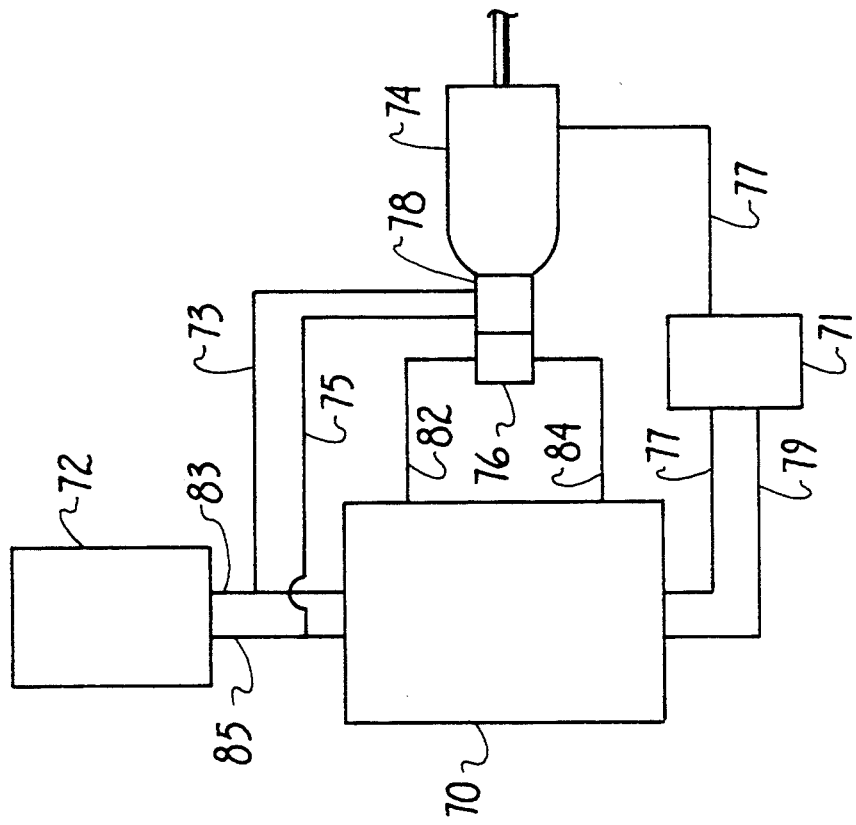
FIG. 5 illustrates a use of an apparatus of the invention with a turbine apparatus.

FIG. 5 illustrates an example of a use of the apparatus of the invention in a system with a gas turbine. It will be appreciated that gas turbine efficiency is substantially improved where cool inlet air temperatures are provided. For example, it is highly advantageous to introduce cool air into a gas turbine at temperature ranges of, for example, between about 60° F. and about −40° F., for substantially increasing the power output, efficiency and capacity of the gas turbine to generate electric power. A heat exchange means providing low gas inlet temperatures utilizes, for example, a glycol water heat exchange solution in a heat exchanger through which the air passes. As the air is cooled, it becomes saturated with water vapor, undesirable in the turbine. It is thus necessary to warm the cooled air slightly to reduce its relative humidity from about 100% to, for example, less than about 90%. An apparatus of the invention which provides simultaneous cooling and heating as previously described may be used quite advantageously to provide cooling for the gas turbine inlet air, and simultaneously provide heat for slightly heating the inlet air to reduce its relative humidity.

The schematic system of FIG. 5 illustrates the use of a dual temperature apparatus 70 of the invention for providing cold refrigerant (FIG. 3), or cold heat exchange fluid (FIG. 4) via conduit 84 to air inlet cooler 76 for gas turbine 74. Heat exchange fluid or refrigerant circulated through cooler 76 is returned to the reactor system via line 82. Simultaneously, hot water or heat transfer fluid from apparatus 70 may be directed via pipe 73 for heating the air in heat exchanger 78 just before it enters the turbine. In addition, hot exhaust gas from the gas turbine 74 may be advantageously used and directed via conduit 77 to heat exchanger 71 to provide heat for driving desorbing reactors in apparatus 70. A fluid loop between the reactor system and heat exchanger 71 is also provided via pipes 77 and 79. Excess heat produced by the reactor system may be disposed of by directing it to heat rejection means 72, for example, a cooling tower, air coil or evaporative cooler, via line 83, which also may be tied to line 73 for providing the heat for heat exchanger 78, as previously described. A return line 85 between heat rejection apparatus 72 and the reactor assembly is also shown, and connected to return line 75. The type of heat exchangers 76 and 78 may be of a direct contact, liquid to air, type, or may be of an indirect type, for example, fin and tube. If a glycol-water mixture, or similar cold temperature water containing heat exchange liquid is used in a direct contact air cooler heat exchanger, reject heat from reactor assembly may also be used advantageously to lean out or reduce water concentration in the liquid. Reactor reject heat may also be used to defrost an indirect type air cooler. Turbine exhaust gas heat may also be used for driving water from a heat exchange liquid and/or defrosting an air cooler.

Although the aforesaid embodiments have been directed primarily to the recovery and immediate use of the recovered condensed refrigerant and heated transfer fluid (first embodiment), or the dual temperature recovery of the heat transfer fluid (FIG. 4 embodiment), these apparatus may also be used for providing thermal storage. Thus, rather than immediately using the condensed or adsorbed ammonia or other refrigerant for plant cooling or refrigeration operations, it may be stored in a suitable liquid ammonia storage vessel or complex compound reactor, and used to provide refrigeration at peak energy use hours, for example during the day when electricity demands and costs are relatively high and the heated water may be stored in appropriate hot water tanks to be used for later processing. In addition, the dual-salt reactor system illustrated in FIG. 4 may be operated for storing thermal energy for later use by heating the high temperature reactor (reactor 50) to desorb refrigerant which is directed to the lower temperature reactor (reactor 60) where it is adsorbed in the salt. The system is then held in that state until the stored energy is to be later used by reversing the cycle as previously described for providing cooling from desorbing reactor 60, and/or providing heating from now adsorbing reactor 50. As used herein, the term "receiving means" is intended to cover any of the aforesaid alternatives.

Although the systems and apparatus of the invention have been described as using two reactors, or pairs of reactors, it is to be understood that the invention is not limited to such numbers of reactors. Thus, a system of the invention comprises a plurality of sub-systems, each comprising a plurality of reactors operated, for example, in time shifted modes or cycle phases to deliver smooth and continuous cooling and heating. The temperature range of heat transfer fluids recovered for heating and refrigerant for cooling will depend primarily on the reactants used, the size or capacity of the reactors, and the initial temperature of fluids and refrigerants introduced to the apparatus. For example, if heat transfer fluid in the form of water at temperatures of about 40° F. and about 80° F. is introduced, heated water recovered at between about 125° F. and about 200° F. could be expected. On the other hand, if water preheated to, for example, 100° F.–200° F. is introduced, steam may be recovered. Moreover, the dual-temperature systems are not to be limited for industrial purposes but may be useful in any environment where such results are advantageous. These, as well as other embodiments within the scope of the invention, as well as the advantages and uses thereof, will be evident to those skilled in the art.

It is claimed:

1. Apparatus for simultaneously supplying heating and cooling or refrigeration, comprising:

first and second reactors, each containing a reactant comprising a complex compound of a metal salt selected from the group consisting of a metal oxide, halide, nitrate, nitrite, sulfate, oxalate and sulfide and mixtures and compounds thereof, wherein the metal is selected from the group consisting of alkali metal, alkaline earth metal, transition metal, aluminum, zinc, cadmium and tin, and a gaseous refrigerant adsorbed thereon selected from the group consisting of ammonia, water, sulfur dioxide, lower alkanol, alkanolamine, polyamine and phosphine, or a metal carbonate comprising a reaction product of said metal oxide and carbon dioxide gaseous refrigerant, a condenser for condensing said gaseous refrigerant;

a first refrigerant conduit assembly for directing said gaseous refrigerant alternately to said first and second reactors, respectively, a second refrigerant conduit assembly for directing gaseous refrigerant alternately from said first and second reactors, respectively, to said condenser, and a third refrigerant conduit assembly for directing condensed gaseous refrigerant from said condenser to refrigerant condensate receiving means, heating means for heating said complex compound or said metal carbonate alternately in said first and second reactors, respectively, and heat extraction means including a first heat exchanger for providing heat exchange communication between said condenser and said first and second reactors for extracting heat from said complex compounds carbonate alternately in said first and second reactors, respectively, and a first fluid conduit assembly for directing a heat transfer fluid in heat exchange communication with said condenser and said heat extraction means whereby said heat transfer fluid becomes heated by said heat exchange communication, and a second fluid conduit assembly for directing said heated heat transfer fluid from said condenser to receiving means therefor.

2. Apparatus of claim 1, including a liquid subcooler cooperating with said third refrigerant conduit assembly and wherein said third refrigerant conduit assembly directs condensed gaseous refrigerant from said condenser to said subcooler and from said subcooler to said refrigerant condensate receiving means.

3. Apparatus of claim 2, including a second heat exchanger for providing heat exchange communication between said second refrigerant conduit assembly and said second fluid conduit assembly, and wherein said first and second fluid conduit assemblies cooperate to direct said heat exchange transfer fluid successively to said subcooler, said condenser and said second heat exchanger for increasingly heating said heat transfer fluid.

4. Apparatus of claim 3 wherein said first fluid conduit assembly directs a first heat transfer fluid to said first heat exchanger and from said heat exchanger to said condenser, said apparatus including a third fluid conduit assembly for directing a second heat transfer fluid from said first and second reactors to said first heat exchanger, and wherein said first and second heat transfer fluids are in heat exchange communication in said first heat exchanger.

5. Apparatus of claim 3 wherein said second and third refrigerant conduit assemblies cooperate to direct said gaseous refrigerant successively to said second heat exchanger, said condenser and said subcooler for increasingly cooling said refrigerant.

6. Apparatus of claim 5 including means for simultaneously recovering heat from the heated heat transfer fluid and recovering cooling from the cooled refrigerant.

7. Apparatus of claim 2, including a second heat exchanger for providing heat exchange communication between said second refrigerant conduit assembly and said second fluid conduit assembly, and wherein said second and third refrigerant conduit assemblies cooperate to direct said gaseous refrigerant successively to said second heat exchanger, said condenser and said subcooler for increasingly cooling said refrigerant.

8. Apparatus of claim 7 wherein said first fluid conduit assembly directs a first heat transfer fluid to said first heat exchanger and from said first heat exchanger to said condenser, said apparatus including a third fluid conduit assembly for directing a second heat transfer fluid from said first and second reactors to said first heat exchanger, and wherein said first and second heat transfer fluids are in heat exchange communication in said first heat exchanger.

9. Apparatus of claim 1, including a second heat exchanger for providing heat exchange communication between said second refrigerant conduit assembly and said second fluid conduit assembly.

10. Apparatus of claim 1, including control means cooperating with said heating means and said heat extraction means for heating said reactant in one of said first or second reactors while simultaneously extracting heat from said reactant in the other of said first or second reactors.

11. Apparatus of claim 10, wherein said heating means comprises means for directing a first heat transfer fluid to and from said first and second reactors, and wherein said apparatus includes a third fluid conduit assembly for directing a second heat transfer fluid to said heat extraction means from said first and second reactors.

12. Apparatus of claim 11, wherein said first heat exchanger provides heat exchange communication between said first and said second heat transfer fluids.

13. Apparatus of claim 1 wherein said reactant comprises $CaCl_2 \cdot 2-4(NH_3)$ or $CaCl_2 \cdot 4-8(NH_3)$.

14. Apparatus of claim 1 wherein said reactant comprises $SrCl_2 \cdot 1-8(NH_3)$ or $SrBr_2 \cdot 0-8(NH_3)$.

15. Apparatus of claim 1 wherein said reactant comprises $CaBr_2 \cdot 2-6(NH_3)$.

16. Apparatus of claim 1 wherein said reactant comprises $CoCl_2 \cdot 2-6(NH_3)$.

17. Apparatus of claim 1 wherein said reactant comprises $NiCl_2 \cdot 2-6(NH_3)$.

18. Apparatus of claim 1 wherein said reactant is $FeCl_2 \cdot 2-6(NH_3)$.

19. Apparatus of claim 1 wherein said reactant is $NaBF_4 \cdot 0.5-2.5(NH_3)$.

20. Apparatus of claim 1, wherein said refrigerant is ammonia.

21. Apparatus of claim 1, wherein said heat transfer fluid is water.

22. A thermal energy storage system comprising an apparatus of claim 1 and liquid refrigerant storage means for receiving and holding liquid refrigerant.

23. A system of claim 22, including heat transfer fluid storage means for receiving and holding heated heat transfer fluid.

24. Apparatus of claim 1 wherein said first fluid conduit assembly directs a first heat transfer fluid to said first heat exchanger and from said first heat exchanger to said condenser, said apparatus including a third fluid conduit assembly for directing a first heat transfer fluid from said first and second reactors to said first heat exchanger, and wherein said first and second heat transfer fluids are in heat exchange communication in said first heat exchanger.

25. Apparatus of claim 1 including means for simultaneously recovering cooling from said refrigerant condensate receiving means and recovering heat from the heated heat transfer receiving means.

* * * * *